United States Patent
Treier et al.

(10) Patent No.: US 7,951,219 B2
(45) Date of Patent: May 31, 2011

(54) CAST FORMED FILTER AND METHOD OF MAKING THE SAME

(75) Inventors: Philip P. Treier, Bloomdale, OH (US); Christopher P. Montelauro, Bowling Green, OH (US)

(73) Assignee: Honeywell International Inc., Morristown, NJ (US)

( * ) Notice: Subject to any disclaimer, the term of this patent is extended or adjusted under 35 U.S.C. 154(b) by 637 days.

(21) Appl. No.: 11/847,627

(22) Filed: Aug. 30, 2007

(65) Prior Publication Data

US 2008/0053048 A1  Mar. 6, 2008

Related U.S. Application Data

(60) Provisional application No. 60/824,128, filed on Aug. 31, 2006.

(51) Int. Cl.
*B01D 46/00* (2006.01)
(52) U.S. Cl. ............................. 55/484; 55/523; 55/528
(58) Field of Classification Search .................. 55/484, 55/527, 528, 523, 522
See application file for complete search history.

(56) References Cited

U.S. PATENT DOCUMENTS 6,471,740 B2 * 10/2002 Kobayashi et al. ............. 55/502
6,673,136 B2    1/2004 Gillingham et al.
2001/0032545 A1 10/2001 Goto et al.
2002/0132960 A1  9/2002 Haile et al.
2003/0101701 A1  6/2003 Henrichsen et al.
2006/0019061 A1*  1/2006 Oshimi .......................... 428/116
2006/0070364 A1*  4/2006 Reamsnyder et al. .......... 55/484

OTHER PUBLICATIONS

International Search Report dated Feb. 22, 2008 for PCT/US2007/77213.
Written Opinion of the International Searching Authority dated Feb. 22, 2008 for PCT/US2007/77213.

* cited by examiner

*Primary Examiner* — Duane Smith
*Assistant Examiner* — Tiffany N Palmer
(74) *Attorney, Agent, or Firm* — Cantor Colburn LLP

(57) ABSTRACT

A cast formed filter and a method for making the filter are provided. The cast formed filter includes a cast formed filter media having an inlet end, an outlet end, a plurality of inlet openings, a plurality of outlet openings, and a fluid path. The plurality of inlet openings extend from the inlet end into the cast formed filter media, wherein a first portion of the cast formed filter media is disposed between each of the plurality of inlet openings and the outlet end. The plurality of outlet openings extend from the outlet end into the cast formed filter media, wherein a second portion of the cast formed filter media is disposed between each of the plurality of outlet openings and the inlet end, the second portion comprising at least a portion of the first portion of cast formed filter media. The fluid path extends through at least one of the plurality of inlet openings and through at least one of the plurality of outlet openings, wherein fluid flowing through the fluid path is filtered by the cast formed filter media.

12 Claims, 3 Drawing Sheets

CAST FORMED FILTER AND METHOD OF MAKING THE SAME

CROSS REFERENCE TO RELATED APPLICATIONS

This application claims the benefit of U.S. Provisional Patent Application Ser. No. 60/824,128 filed Aug. 31, 2006 the contents of which are incorporated herein by reference thereto.

BACKGROUND

The present application relates to a cast formed filter and a method for making the same.

Air induction housing systems are continually being challenged to become smaller and unique in shape without loss of system performance. In particular and referring to vehicular applications, this is due in part to the reduction in available real estate in the engine compartment. As vehicle profiles are reduced and engine systems become more complex there is very little available space for the air induction system, which is a critical component of the engine. The air induction system in an internal combustion engine of a vehicle that provides at least two important functions; providing a means for delivery of air into the combustion chambers of the engine and providing a means for filtering the air prior to its delivery to the combustion chambers. Due to its filtering function, the filter itself needs to be replaced after an extended period of use thus, accessibility to the filter is also a requirement imposed upon the air induction system as well as the housing.

In some designs the air induction system is not designed until the engine design is completed thus, the designers of the air induction system are typically faced with the problem of providing a predetermined amount of airflow to the engine while also being presented with a limited or unique amount of space between the engine and the vehicle hood, front grill etc. Accordingly, the air induction housing typically has a unique configuration that is optimized for flow and space requirements, which may be contradictory to design requirements for the filter to be located within the air induction system.

Furthermore, reducing the housing size and creating unique shapes limits the overall size of the filter capable of being disposed therein. Accordingly, and based upon conventional airflow technology, smaller filters typically result in less capacity thus, reduced performance. Additionally, making filters having unique configurations can require many manufacturing steps in producing the filter.

Accordingly, it is desirable to provide a filter and simplified method of manufacturing the same, wherein the filter accommodates imposed size and shape limitations yet the filter provides a high capacity for filtration.

SUMMARY OF THE INVENTION

A cast formed filter in accordance with exemplary embodiment is provided. The cast formed filter includes a cast formed filter media having an inlet end, an outlet end, a plurality of inlet openings, a plurality of outlet openings, and a fluid path. The plurality of inlet openings extend from the inlet end into the cast formed filter media, wherein a first portion of the cast formed filter media is disposed between each of the plurality of inlet openings and the outlet end. The plurality of outlet openings extend from the outlet end into the cast formed filter media, wherein a second portion of the cast formed filter media is disposed between each of the plurality of outlet openings and the inlet end, the second portion comprising at least a portion of the first portion of cast formed filter media. The fluid path extends through at least one of the plurality of inlet openings and through at least one of the plurality of outlet openings, wherein fluid flowing through the fluid path is filtered by the cast formed filter media.

A cast formed filter for a non-uniform shaped housing in accordance with another exemplary embodiment is provided. The cast formed filter includes a cast formed filter media configured to be disposed in the non-uniform shaped housing. The cast formed filter media has an inlet end, an outlet end, a plurality of inlet openings, a plurality of outlet openings, and a fluid path. The plurality of inlet openings extending from the inlet end into the cast formed filter media, wherein a first portion of the cast formed filter media is disposed between each of the plurality of inlet openings and the outlet end. The plurality of outlet openings extending from the outlet end into the cast formed filter media, wherein a second portion of the cast formed filter media is disposed between each of the plurality of outlet openings and the inlet end, the second portion comprising at least a portion of the first portion of cast formed filter media, wherein the cast formed filter media is arranged in a non-uniform configuration complementary with a periphery of the non-uniform shaped housing. The fluid path extends through at least one of the plurality of inlet openings and through at least one of the plurality of outlet openings, wherein fluid flowing through the fluid path is filtered by the cast formed filter media.

A method of making a cast formed filter in accordance with another exemplary embodiment is provided. The method includes disposing a liquid filter media in a cavity of a molding tool, the molding tool having a plurality of features configured so that the filter media is formed about the plurality of features to form a plurality of inlet openings and a plurality of outlet openings in the filter media; applying at least one of pressure and heat to the filter media disposed in the molding tool to cure the liquid filter media and obtain a cast formed filter media defined by the cavity of the molding tool; and removing the cast formed filter media from the molding tool, wherein the cast formed filter media maintains a configuration having a three-dimensional periphery and the plurality of inlet openings extend from an inlet end of the cast filter media into the cast formed filter media so a first portion of the cast formed filter media is disposed between each of the plurality of inlet openings and an outlet end, and the plurality of outlet openings extend from the outlet end into the cast formed cast filter media so a second portion of the cast formed filter media is disposed between each of the plurality of outlet openings and the inlet end.

DETAILED DESCRIPTION OF EXEMPLARY EMBODIMENTS

Figure 1:
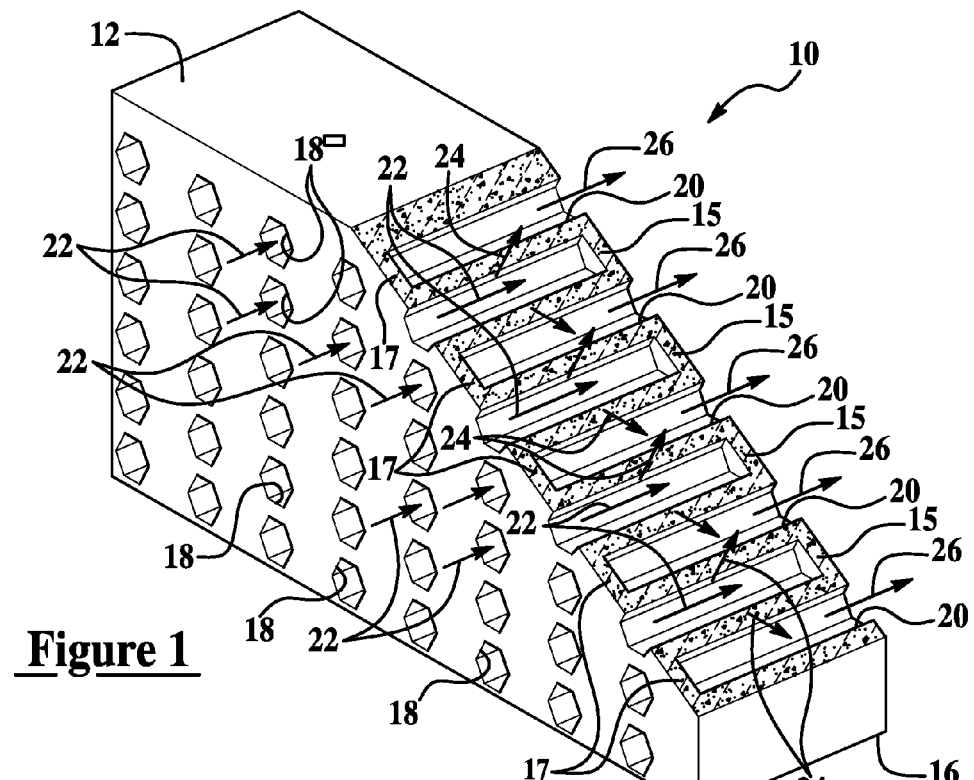
FIG. 1 is a perspective and partial cross-sectional view of a portion of a cast formed filter in accordance with an exemplary embodiment of the present invention.

Reference is made to the following United States patent applications, U.S. Ser. No. 11/241,245 and U.S. Pat. No. 6,673,136 the contents of which are incorporated herein by reference thereto.

In accordance with an exemplary embodiment of the present invention, a cast formed filter and a method of making the same is disclosed herein. In an exemplary embodiment, a configuration of the cast formed filter is made by forming or shaping filter media using a casting or molding process. The cast formed filter filters a fluid flowing therethrough. Non-limiting examples of the fluid to be filtered include gases and combinations thereof (e.g. air), water, fuels, oils, coolants, etc.

It is contemplated that a molding or casting tool used in the manufacturing process is configured to produce a particular configuration of the cast formed filter media. Exemplary embodiments of the configuration of the cast formed filter include exterior features as well as interior features. Due to the flexibility of the molding process, the particular configuration of the cast formed filter media accommodates an application that requires a unique exterior shape and size to satisfy a restricted space limitation for the cast formed filter media and or an application that requires a non-uniform periphery.

In an exemplary embodiment, an exterior periphery may be defined by a geometric shape, a non-uniform or non-geometric shape, or a combination thereof. For example and in a non-limiting exemplary embodiment, a configuration of the cast formed filter has an outer periphery that is configured to engage a complementary periphery of a housing that receives the cast formed filter media. In an exemplary embodiment, a cross sectional shape of an opening and or a shape of a length of the opening in the cast formed filter media may be defined by a geometric shape, a non-uniform or non-geometric shape, or a combination thereof. For example, in an exemplary embodiment, a periphery or an opening may have a shape that is circular, oval, hexagon, triangular, diamond, square, elliptical, non-geometric, or any combination thereof.

In an exemplary embodiment, a number of openings and their configuration within the cast formed filter can increase surface filter area through the cast formed filter without restricting fluid flow, thereby providing a high capacity for filtration. In an exemplary embodiment, in accordance with a particular application, a configuration of openings in the cast formed filter media satisfies a unique fluid flow path requirement, an increase of filtration paths through the formed filter media, and or a predetermined filtration rate. Thus, a configuration of the cast formed filter can be created to provide a high capacity for filtration even for an application that has a restricted space requirement or requires a non-uniform exterior shape for the cast formed filter.

In a non-limiting exemplary embodiment, a configuration of the cast formed filter includes a plurality of inlet openings extending into the cast formed filter media from an inlet end. The cast formed filter media further includes a plurality of outlet openings extending into the cast formed filter media from an outlet end. Each of the plurality of inlet openings and each of the plurality outlet openings do not extend completely through the cast formed filter media. Each of the plurality of inlet openings and each of the plurality of the outlet openings is formed within the cast formed filter media so that a portion of formed filter media separates an inlet opening from an outlet opening. In an exemplary embodiment, a configuration of at least one of the inlet openings may differ from a configuration of at least one of the outlet openings, wherein the configuration may include a cross sectional shape of the opening and or a length or shape of a length of the opening.

In an exemplary embodiment, a fluid flow path extends through at least one of the plurality of inlet openings and through at least one of the plurality of outlet openings, wherein fluid flowing along the flow path is filtered by a portion of the formed filter media of the cast formed filter media. Of course, fluid can be filtered by the cast formed filter media when the fluid flows through a portion of the formed filter media without flowing through an inlet or an outlet opening. In an exemplary embodiment, media or material used to make the cast formed filter media is selected, for example, in accordance with the fluid to be filtered, a fluid flow rate through the filter, manufacturing considerations, a predetermined fluid filtration rate, an operational temperature of the fluid being filtered, and or a filter replacement interval. In a non-limiting exemplary embodiment, media used to make the cast formed filter media includes synthetic fiber, such as for example polyester fiber.

Figure 2:
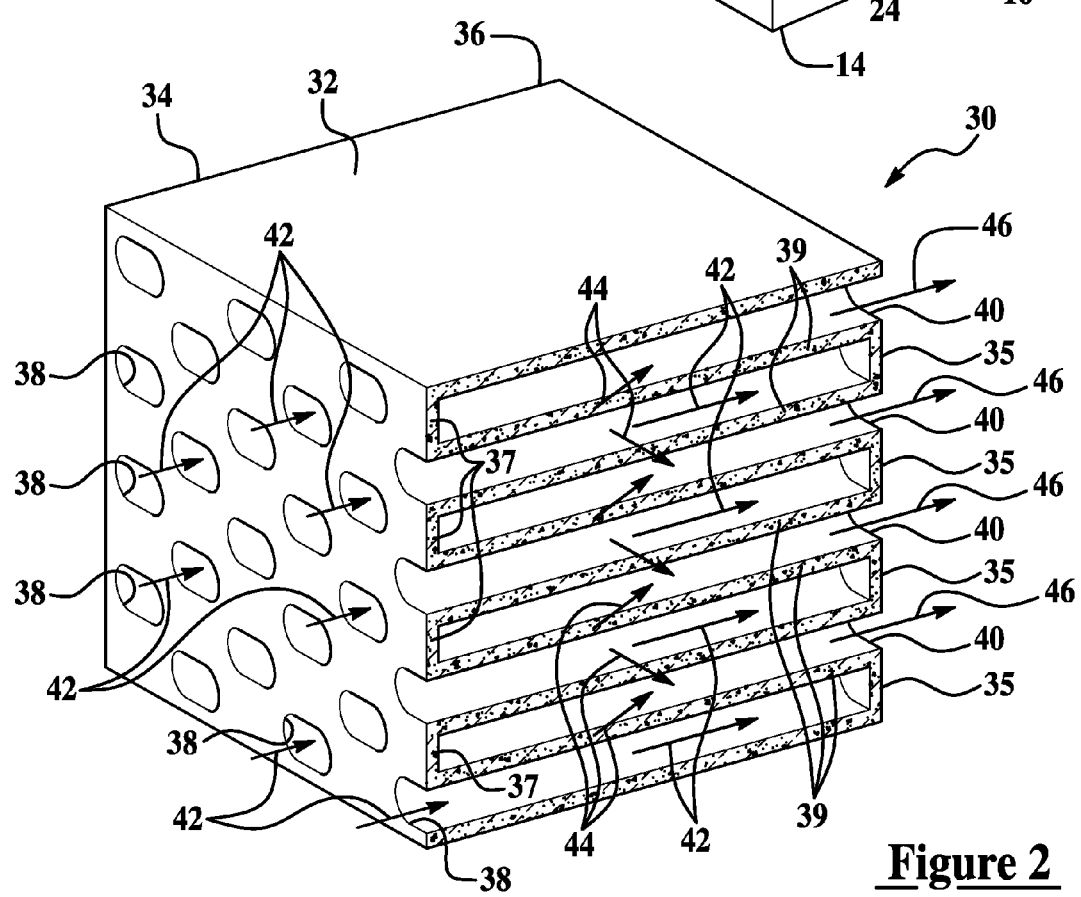
FIG. 2 is a perspective view and partial cross-sectional of a portion of a cast formed filter in accordance with an alternative exemplary embodiment.
Figure 3:
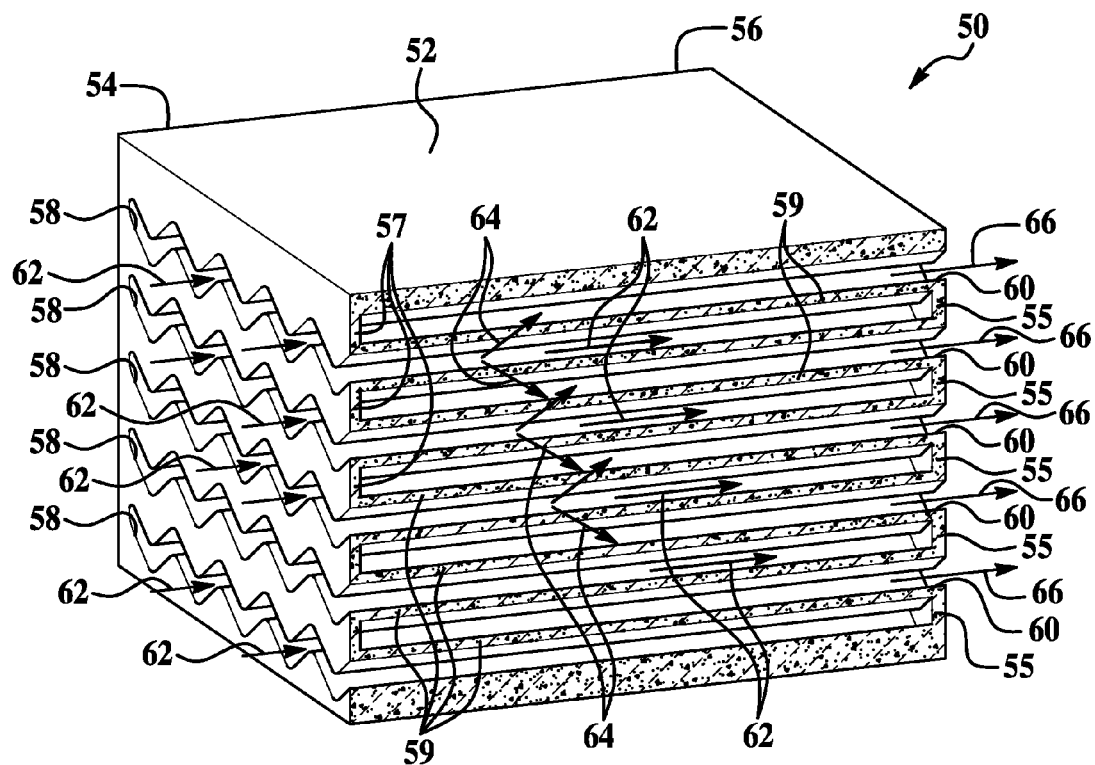
FIG. 3 is a perspective view and partial cross-sectional of a portion of a cast formed filter in accordance with another alternative exemplary embodiment.

Referring now to FIGS. 1-3, examples of exemplary embodiments of configurations of a cast formed filter will be discussed. As illustrated in FIGS. 1-3, a partial cross-sectional view is provided wherein an interior portion of the cast formed filter is shown in each of the figures to illustrate a configuration of inlet openings and outlet openings arranged within the cast formed filter media. Outer peripheries of the cast formed filter are not to be limited to those shown in FIGS. 1-3. In accordance with an exemplary embodiment of the present invention, the side walls of the cast formed filter not comprising the inlet openings or the outlet openings will consist of the filter media thus having no inlet or outlet openings therein. In some exemplary embodiments the cast formed filter media will be surrounded on the side walls not having the inlet and outlet openings by a filter housing having an inlet opening corresponding to the inlet openings and an outlet opening corresponding to the outlet openings. In one exemplary embodiment, the housing will be part of a conduit system or the housing will surround the cast formed filter media and is configured to be received within a conduit system.

Referring now to FIG. 1 and in an exemplary embodiment, a cast formed filter 10 includes a cast formed filter media 12, an inlet end 14, an outlet end 16, a plurality of inlet openings 18, and a plurality of outlet openings 20. Each of the plurality of inlet openings extends into formed filter media 12 from inlet end 14 such that formed filter media 15 is disposed between each of the plurality of inlet openings and outlet end 16. Each of the plurality of outlet openings extends into formed filter media 12 from outlet end 16 such that formed filter media 17 is disposed between each of the plurality of outlet openings and inlet end 14. Formed filter media 19 is disposed between each of the plurality of inlet openings and an adjacent outlet opening. Formed filter media 15, 17 and 19 are portions of formed filter media 12. Depending on a configuration of cast formed filter 10, portions of formed filter media 15, 17 and 19 may blend into each other.

Each of plurality of inlet openings 18 and each of plurality of outlet openings 20 has a substantially hexagon cross sectional shape. Of course, other configurations are considered to be within the scope of exemplary embodiments of the present invention. Plurality of inlet openings 18 are arranged within formed filter media 12 as spaced substantially parallel rows and spaced substantially parallel columns, as shown in FIG. 1. Although not fully shown in FIG. 1, plurality of outlet openings 20 are arranged within formed filter media 12 as spaced substantially parallel rows and spaced substantially parallel columns, wherein the rows and columns of the outlet openings are also substantially parallel with respect to the rows and columns of the inlet openings.

In an exemplary embodiment, a fluid flow path extends through at least one of plurality of inlet openings 18 and through at least one of plurality of outlet openings 20, wherein fluid is filtered by at least a portion of formed filter media 12 along the flow path. In a non-limiting example, fluid enters cast formed filter 10 through at least one of plurality of inlet openings 18 along a flow path 22 in a direction toward outlet end 16. The fluid in the inlet opening flows through formed filter media 19 along a flow path 24 into at least one of plurality of outlet openings 20, wherein the fluid is filtered by formed filter media 19 along flow path 24. The fluid then flows through at least one of the outlet openings out of cast formed filter 10 along a flow path 26. Of course in another application, the flow path could be reversed such that fluid flows into at least one of the plurality of outlet openings at the outlet end and exits the cast formed filter media by flowing through at least one of the plurality of inlet openings at the inlet end, the fluid being filtered by passing through at least a portion of the cast formed filter media along the flow path.

In other applications, fluid may be filtered by formed filter media 12 by flowing along alternative flow paths. For example, fluid is filtered by formed filter media 17 when the fluid enters at least one plurality of outlet openings 20 by first passing through formed filter media 17. In another application, fluid is filtered by formed filter media 15 when the fluid enters at least one plurality of inlet openings 18 by first passing through formed filter media 15. Of course, fluid is filtered by formed filter media 15 if the fluid entering an inlet opening flows through formed filter media 15 at outlet end 16, rather than flowing through another portion of formed filter media 12. Similarly, fluid is filtered by formed filter media 17 if the fluid entering an outlet opening flows through formed filter media 17 at inlet end 14, rather than flowing through another portion of formed filter media 12. And in another application, fluid is filtered by a portion of formed filter media 12 when the fluid passes only through the formed filter media and does not pass through one of the inlet or outlet openings.

Referring now to FIG. 2, a portion of a cast formed filter media 30 in accordance with another exemplary embodiment is illustrated. Cast formed filter media 30 includes formed filter media 32, an inlet end 34, an outlet end 36, a plurality of inlet openings 38, and a plurality of outlet openings 40. Each of the plurality of inlet openings extends into formed filter media 32 from inlet end 34 such that formed filter media 35 is disposed between each of the plurality of inlet openings and outlet end 36. Each of the plurality of outlet openings extends into formed filter media 32 from outlet end 36 such that formed filter media 37 is disposed between each of the plurality of outlet openings and inlet end 34. Formed filter media 39 is disposed between each of the plurality of inlet openings and an adjacent outlet opening. Formed filter media 35, 37 and 39 are portions of formed filter media 32. Depending on a configuration of cast formed filter media 30, portions of formed filter media 35, 37 and 39 may blend into each other.

Each of plurality of inlet openings 38 and each of plurality of outlet openings 40 has an approximate oval cross sectional shape. Of course, other configurations are considered to be within the scope of exemplary embodiments of the present invention. The plurality of inlet openings 38 are arranged within formed filter media 32 as spaced substantially parallel rows and spaced substantially parallel columns, as shown in FIG. 2. Although not fully shown in FIG. 2, plurality of outlet openings 40 are arranged within formed filter media 32 as spaced substantially parallel rows and spaced substantially parallel columns, wherein the rows and columns of outlet openings are also substantially parallel with respect to the rows and columns of inlet openings. The rows of the inlet openings and the outlet openings are further arranged with respect to each other so that the openings of one row are disposed between the openings of an adjacent row of openings. The columns of the inlet openings and the outlet openings are further arranged with respect to each other so that the openings of one column are disposed between the openings of an adjacent column of openings.

In an exemplary embodiment, a fluid flow path extends through at least one of plurality of inlet openings 38 and through at least one of plurality of outlet openings 40, wherein fluid is filtered by at least a portion of formed filter media 32 along the flow path. For example, fluid enters formed filter media 32 through at least one of plurality of inlet openings 38 along a flow path 42 in a direction toward outlet end 36. The fluid in the inlet opening flows through formed filter media 39 along a flow path 44 into at least one of plurality of outlet openings 40, wherein the fluid is filtered by formed filter media 39 along flow path 44. The fluid then flows through at least one of plurality of outlet openings 40 out of cast formed filter media 30 along a flow path 46. In other exemplary embodiments, fluid is filtered by cast formed filter media 30 by flowing along alternative flow paths similar to those discussed for cast formed filter media 10.

Referring now to FIG. 3, a portion of a cast formed filter media 50 in accordance with another exemplary embodiment is illustrated. Cast formed filter media 50 includes formed filter media 52, an inlet end 54, an outlet end 56, a plurality of inlet openings 58, and a plurality of outlet openings 60. Each of the plurality of inlet openings extends into formed filter media 52 from inlet end 54 such that formed filter media 55 is disposed between each of the plurality of inlet openings and outlet end 56. Each of the plurality of outlet openings extends into formed filter media 52 from outlet end 56 such that formed filter media 57 is disposed between each of the plurality of outlet openings and inlet end 54. Formed filter media 59 is disposed between each of the plurality of inlet openings and an adjacent outlet opening. Formed filter media 55, 57 and 59 are portions of formed filter media 52. Depending on a configuration of cast formed filter media 50, portions of formed filter media 55, 57 and 59 may blend into each other.

Each of plurality of inlet openings 58 and each of plurality of outlet openings 60 has an elongated zig-zag cross sectional shaped opening. Of course, other configurations are considered to be within the scope of exemplary embodiments of the present invention. Plurality of inlet openings 58 are arranged within formed filter media 52 as spaced substantially parallel rows, as shown in FIG. 3. Although not fully shown in FIG. 3, plurality of outlet openings 60 are arranged within formed filter media 52 as spaced substantially parallel rows, wherein the rows of outlet openings are also substantially parallel with respect to the rows of inlet openings.

In an exemplary embodiment, a fluid flow path extends through at least one of plurality of inlet openings 58 and through at least one of plurality of outlet openings 60, wherein fluid is filtered by a least a portion of formed filter media 52 along the flow path. For example, fluid enters formed filter media 52 through at least one of plurality of inlet openings 58 along a flow path 62 in a direction toward outlet end 56. The fluid in the inlet opening flows through formed filter media 59 along a flow path 64 into at least one of plurality of outlet openings 60, wherein the fluid is filtered by formed filter media 59 along flow path 64. The fluid then flows through at least one of plurality of outlet openings 60 out of cast formed filter media 50 along a flow path 66. In other exemplary embodiments, fluid is filtered by cast formed filter media 50 by flowing along alternative flow paths similar to those discussed for cast formed filter media 10.

Referring now to FIGS. 4-7, an exemplary embodiment of how molding or casting tools are used for making a configuration of the cast formed filter media will be briefly described. It is contemplated that the molding tools used to produce the configuration of the cast formed filter media have features to form an exterior periphery as well as interior features of the cast formed filter media. In an exemplary embodiment, the molding tools include features to form an exterior periphery that is defined by a geometric shape, a non-uniform or non-geometric shape, or a combination thereof.

For example and in an exemplary embodiment, an exterior of the cast formed filter media is defined by a length and a width, wherein the width defines an outer periphery of the cast formed filter media. In another exemplary embodiment, an exterior of the cast formed filter media has a three-dimensional shape defined by a non-uniform length, a non-uniform width, and a non-uniform height, wherein the non-uniform width and the non-uniform height define an outer periphery of the cast formed filter media. Due to the flexibility of the molding process, the cast formed filter media can have a unique exterior shape and size that accommodates a restricted space limitation for the cast formed filter media and or an application that requires a non-uniform periphery. For example, a housing the cast formed filter media is inserted into. Moreover, and as discussed above the sides of the cast formed filter media not having the inlet openings and the outlet openings may be received within an outer housing that fluidly seals the side wall of the cast formed filter media not having the inlet openings and the outlet openings.

In an exemplary embodiment, the molding tools also include features to form an interior configuration of the cast formed filter media. For example, the interior configuration can include cross sectional shapes of openings and shapes of lengths of the openings. In an exemplary embodiment, the tools are configured to form openings having a configuration defined by a geometric shape, a non-uniform or non-geometric shape, or a combination thereof. Thus, due to the flexibility of the molding process, a cast formed filter media can have a unique configuration of openings to accommodate an application that requires unique flows paths for the fluid to flow therethrough. Additionally, the molding tools can be configured to create a plurality of openings in the cast formed filter media, thereby increasing the surface filter area to provide a cast formed filter media having a high capacity for filtration.

Figure 4:
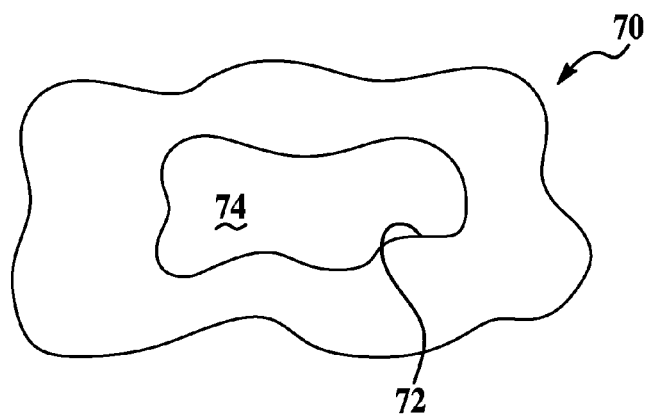
FIG. 4 is a cross sectional view of a portion of a tool used to make a cast formed filter in accordance with an exemplary embodiment.

Referring now to FIG. 4, a portion of a casting or molding tool 70 contemplated for use in manufacturing a configuration of the cast formed filter media in accordance with an exemplary embodiment of the present invention is illustrated. Tool 70 includes a surface 72 that defines a cavity 74. A periphery of surface 72 corresponds to an outer periphery of the cast formed filter media after the molding process is completed. In an exemplary embodiment, two or more tools may be combined to then form the cavity and surface within the combined tools for forming a configuration of cast formed filter media.

For example and in an exemplary embodiment, one configuration of cast formed filter media made by a molding tool that includes an arrangement of inlet and outlet openings as illustrated in FIGS. 1, 2 or 3 and an outer periphery wherein at least a portion of the outer periphery has a circular, rectangular, square, oval, or any other a geometric shape. In another exemplary embodiment, a configuration of cast formed filter media made by a molding tool includes an arrangement of inlet and outlet openings as illustrated in FIGS. 1, 2 or 3 and an outer periphery wherein at least a portion of the outer periphery has a non-uniform or non-geometric shape. Of course, in an alternative exemplary embodiment, a configuration of the cast formed filter media made by a molding tool includes inlet openings and outlet openings that have a configuration different from those shown in FIGS. 1-3 and the cast formed filter media has an exterior periphery defined by a geometric shape, a non-geometric shape, or a combination thereof.

In an exemplary embodiment, the surface defined by the molding tool can be configured to produce an outer periphery of the cast formed filter media that is substantially similar to an interior surface of a housing configured to receive the cast formed filter media. For example and in an exemplary embodiment, a non-uniform configuration of the cast formed filter media is a three-dimensional shape configured to be received in a housing having a non-uniform periphery therein, wherein the non-uniform configuration is defined by a non-uniform length, a non-uniform width, and a non-uniform height. In another exemplary embodiment, a surface of the tool defines a protrusion configured to form a recess in a portion of an outer periphery of the cast formed filter media, wherein the recess is configured to engage a complementary protrusion of the housing. In another exemplary embodiment, a surface of the tool defines a recess configured to form a protrusion in a portion of an outer periphery of the cast formed filter media, wherein the protrusion is configured to engage a complementary recess of the housing. Due to the molding process, it is possible to produce a cast formed filter media that has an outer periphery configured for the geometry of the environment the cast formed filter media will be used therewith.

Figure 5:
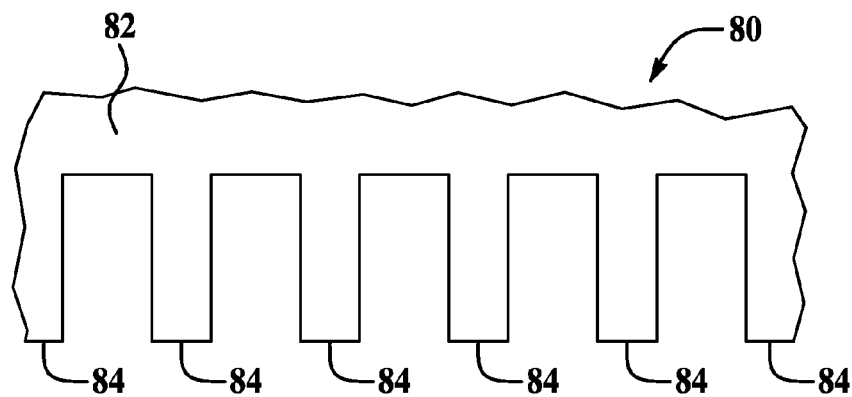
FIG. 5 is a cross sectional view of a portion of a first tool used to make a cast formed filter in accordance with an exemplary embodiment.
Figure 6:
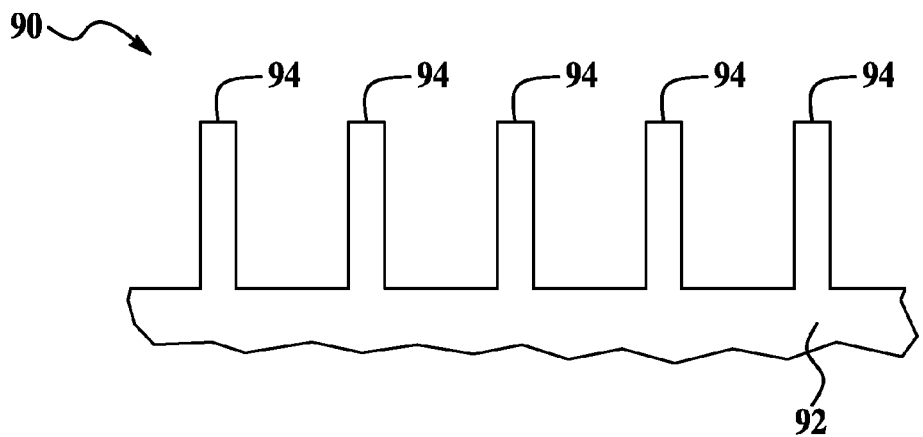
FIG. 6 is a cross sectional view of a portion of a second tool to be utilized with the first tool of FIG. 5 to make the cast formed filter in accordance with an exemplary embodiment.
Figure 7:
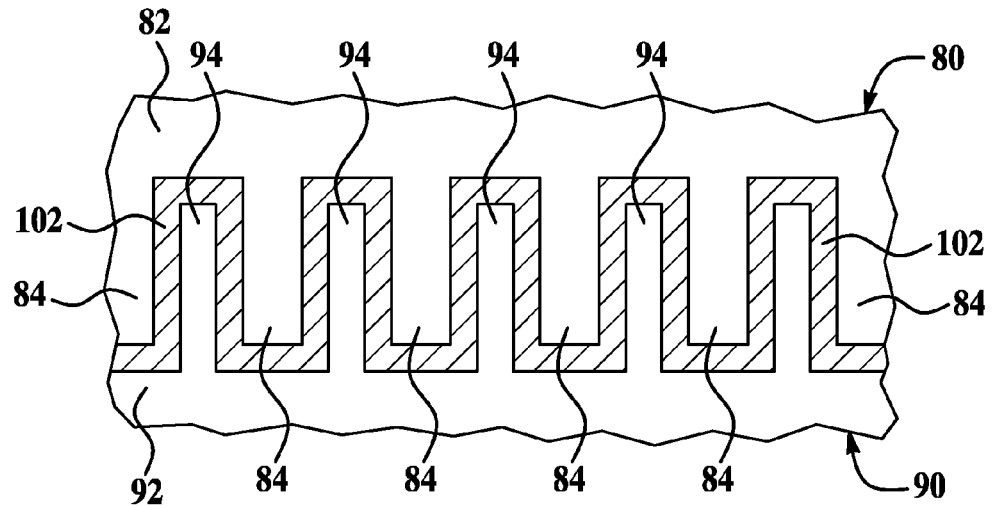
FIG. 7 is a cross sectional view of the first tool of FIG. 5 being utilized with the second tool of FIG. 6 to make the cast formed filter in accordance with an exemplary embodiment.

Referring now to FIGS. 5-7, a non-limiting example of molding tools used to make a configuration of cast formed filter media having an arrangement of inlet openings and outlet openings substantially similar to that of cast formed filter 10 is illustrated. Only a portion of the mold tools are illustrated in FIGS. 5-7 for discussing how a configuration of openings are formed within the cast formed filter media. Although not shown and in an exemplary embodiment, when tool 80 is assembled with tool 90 interior surfaces of tools 80, 90 define a cavity therein for forming an outer periphery of the cast formed filter media. In an alternative exemplary embodiment, any number of tools may be combined to define surfaces and cavities to form a configuration of the cast formed filter media.

In an exemplary embodiment, tool 80 includes a base portion 82 and a plurality of pins 84 extending from base portion 82. Pins 84 have a configuration that corresponds to the configuration of inlet openings 18 of cast formed filter 10 as illustrated in FIG. 1. Tool 90 includes a base portion 92 and a plurality of pins 94 extending from base portion 92. Pins 94 have a configuration that corresponds to the configuration of outlet openings 20 of cast formed filter 10 as illustrated in FIG. 1. In an alternative exemplary embodiment, any pin of the tools may have a unique configuration to form a corresponding unique configuration of an inlet opening or an outlet opening that extends into the cast formed filter media. In exemplary embodiments, the configuration of the pin includes its cross sectional shape, length of the pin, and a shape of the length of the pin. For example, a length of the pin may be shaped to form an inlet opening or an outlet opening wherein at least a portion of the opening's length is substantially straight, curved, a non-uniform shape, or any combination thereof.

In an exemplary embodiment, when tool 80 is assembled with tool 90 plurality of pins 84 and plurality of pins 94 substantially overlap one another in a spaced manner, as illustrated in FIG. 7. A quantity of filter media 102, which is in a liquid, semi-liquid or non-solid state is then disposed or poured within the cavities of tools 80, 90 so that filter media 102 substantially surrounds the peripheries of each of plurality of pins 84 and 94 and substantially fills the cavities of tools 80, 90. After the liquid, semi-liquid or non-solid filter media 102 has cured, or formed into a solid or semi-solid state and into the configuration defined by tools 80, 90, the cast formed filter media is separated from tools 80, 90, wherein the cast formed filter media has the configuration of inlet openings and outlet openings as that of cast formed filter 10 shown in FIG. 1. In exemplary embodiments of the cast formed filter media, the filter media is selected so the cast formed filter media filters fluid passing therethrough in accordance with predetermined filtration criteria. In an exemplary embodiment, filter media 102 includes synthetic fiber, such as for example polyester fiber.

Exemplary embodiments described herein provide a cast formed filter media having unique exterior as well as interior features to accommodate specific application requirements, including restricted space and or non-uniform shape requirements, and the cast formed filter media provides a high capacity for filtration.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the present application.

What is claimed is:

1. A cast formed filter, comprising:
   a cast formed filter media formed from a single structure, the single structure having an inlet surface, an outlet surface, and an exterior side extending from a peripheral edge of the inlet surface to the outlet surface;
   a plurality of inlet openings located on the inlet surface, the plurality of inlet opening being spaced from each other, the plurality of inlet openings being formed at the same time as the single structure;
   a plurality of outlet openings located on the outlet surface, the plurality of outlet openings being spaced from each other, the plurality of outlet openings being formed at the same time as the single structure; and
   wherein a plurality of fluid paths are defined though the single structure, each of the plurality of fluid paths extending from the inlet surface into the cast formed filter media, wherein a first portion of the cast formed filter media is disposed in each of the plurality of fluid paths between each of the plurality of inlet openings and the outlet surface, and wherein each of the plurality of fluid paths extend from the outlet openings into the cast formed filter media, wherein a second portion of the cast formed filter media is disposed in each of the plurality of fluid paths between each of the plurality of outlet openings and the inlet surface, the second portion comprising at least a portion of the first portion of cast formed filter media; and wherein fluid flowing through the plurality of fluid paths is filtered by the cast formed filter media, wherein the cast formed filter media is formed from synthetic fiber.

2. The cast formed filter as in claim 1, wherein the synthetic fiber is polyester fiber.

3. The cast formed filter as in claim 1, wherein the plurality of inlet openings are a plurality of rows of inlet openings.

4. The cast formed filter as in claim 1, wherein the plurality of inlet openings are a plurality of columns of inlet openings.

5. The cast formed filter as in claim 1, wherein the plurality of inlet openings are a plurality of rows of inlet openings and a plurality of columns of inlet openings.

6. The cast formed filter as in claim 1, wherein the plurality of outlet openings are a plurality of rows of outlet openings.

7. The cast formed filter as in claim 1, wherein the plurality of outlet openings are a plurality of columns of outlet openings.

8. The cast formed filter as in claim 1, wherein the plurality of outlet openings are a plurality of rows of outlet openings and a plurality of columns of outlet openings.

9. The cast formed filter as in claim 1, wherein at least one of the plurality of inlet openings has a hexagonal cross-sectional shape.

10. The cast formed filter as in claim 1, wherein at least one of the plurality of outlet openings has a circular cross-sectional shape.

11. A cast formed filter for a non-uniform shaped housing, comprising:
    a cast formed filter media formed from a single structure and configured to be disposed in the non-uniform shaped housing, the cast formed filter media having an inlet end, an outlet end, a plurality of inlet openings, a plurality of outlet openings, and a fluid path;
    the plurality of inlet openings extending from the inlet end into the cast formed filter media, wherein a first portion of the cast formed filter media is disposed between each of the plurality of inlet openings and the outlet end;
    the plurality of outlet openings extending from the outlet end into the cast formed filter media, wherein a second portion of the cast formed filter media is disposed between each of the plurality of outlet openings and the inlet end, the second portion comprising at least a portion of the first portion of cast formed filter media, wherein the cast formed filter media is arranged in a non-uniform configuration complementary with a periphery of the non-uniform shaped housing; and
    the fluid path extending through at least one of the plurality of inlet openings and through at least one of the plurality of outlet openings, wherein fluid flowing through the fluid path is filtered by the cast formed filter media and wherein the cast formed filter media is formed from synthetic fiber.

12. The cast formed filter as in claim 11, wherein at least one of the plurality of inlet openings has a configuration that is not the same as a configuration of at least one of the plurality of outlet openings.

* * * * *